(12) United States Patent
Baader

(10) Patent No.: US 10,006,200 B2
(45) Date of Patent: Jun. 26, 2018

(54) INSULATED CONCRETE PANEL FORM AND METHOD OF MAKING SAME

(71) Applicant: Benjamin Baader, Onoway (CA)

(72) Inventor: Benjamin Baader, Onoway (CA)

(73) Assignee: Benjamin Baader (CA)

( * ) Notice: Subject to any disclaimer, the term of this patent is extended or adjusted under 35 U.S.C. 154(b) by 0 days. days.

(21) Appl. No.: 15/030,944

(22) PCT Filed: Dec. 16, 2014

(86) PCT No.: PCT/CA2014/000904
§ 371 (c)(1),
(2) Date: Apr. 21, 2016

(87) PCT Pub. No.: WO2015/089642
PCT Pub. Date: Jun. 25, 2015

(65) Prior Publication Data
US 2016/0281361 A1    Sep. 29, 2016

Related U.S. Application Data

(60) Provisional application No. 61/917,188, filed on Dec. 17, 2013.

(51) Int. Cl.
*E04B 2/84* (2006.01)
*E04C 2/36* (2006.01)
(Continued)

(52) U.S. Cl.
CPC ............ *E04C 2/36* (2013.01); *B29C 44/1271* (2013.01); *E04B 2/8617* (2013.01);
(Continued)

(58) Field of Classification Search
CPC ...... E04B 2/8617; E04B 2/8647; E04G 17/06; E04G 11/18; E04C 2/044; E04C 2/205; E04C 2/288
See application file for complete search history.

(56) References Cited

U.S. PATENT DOCUMENTS 839,819 A  *  1/1907  DeLhorbe ............... E04G 17/06
                                                      249/192
1,421,956 A  *  7/1922  Kestler .................. E04G 11/18
                                                      249/180
(Continued)

FOREIGN PATENT DOCUMENTS

CA    2 597 832 A1    2/2009
EP    0764745         3/1997
WO    9516835         6/1995

OTHER PUBLICATIONS

International Search Report Corresponding to PCT/CA2014/000904 dated Mar. 11, 2015.
(Continued)

*Primary Examiner* — Gisele D Ford
(74) *Attorney, Agent, or Firm* — Robert A. Nissen

(57) ABSTRACT

An insulated concrete form panel system, and method of making same, is provided, the system and method comprising first and second opposed panels forming a cavity therebetween and an internal connector frame serving as a mold for receiving expandable polymer material to form the first and second panels, such that the irreleasably pre-assembled connector frame extends between, and is integral to, first and second panels. The present system provides first and second panel pairs may be mechanically connected to panel pairs positioned adjacent thereto (e.g. above, below, or side-by-side), increasing integrity of the structure.

19 Claims, 9 Drawing Sheets

(51) Int. Cl.

| | |
|---|---|
| *E04B 2/86* | (2006.01) |
| *B29C 44/12* | (2006.01) |
| *E04C 2/288* | (2006.01) |
| *E04C 2/34* | (2006.01) |
| *E04B 2/00* | (2006.01) |
| *E04G 11/06* | (2006.01) |
| *B29K 25/00* | (2006.01) |
| *B29K 105/04* | (2006.01) |
| *B29L 31/00* | (2006.01) |

(52) U.S. Cl.
CPC ............ *E04B 2/8635* (2013.01); *E04C 2/288* (2013.01); *E04C 2/34* (2013.01); *E04C 2/46* (2013.01); *E04G 11/06* (2013.01); *B29K 2025/06* (2013.01); *B29K 2105/04* (2013.01); *B29L 2031/757* (2013.01); *B29L 2031/776* (2013.01); *E04C 2002/3488* (2013.01)

(56) References Cited

U.S. PATENT DOCUMENTS

| | | | | |
|---|---|---|---|---|
| 1,852,049 A * | 4/1932 | Graef | ................... | E04B 2/8647 52/422 |
| 1,991,256 A * | 2/1935 | Muntz | ................... | E04G 17/06 249/213 |
| 2,365,563 A * | 12/1944 | Krueper | ................ | E04G 17/06 249/213 |
| 2,739,364 A * | 3/1956 | Clemans | ................ | E04G 11/18 249/27 |
| 3,751,867 A * | 8/1973 | Layne | .................. | E04B 2/8647 52/426 |
| 3,985,329 A * | 10/1976 | Liedgens | .............. | E04B 2/8647 249/216 |
| 3,995,825 A * | 12/1976 | Ward | ..................... | E04G 17/06 249/214 |
| 4,604,843 A | 8/1986 | Renaud | | |
| 4,765,109 A * | 8/1988 | Boeshart | ............... | E04B 2/8641 52/426 |
| 4,889,310 A * | 12/1989 | Boeshart | ............... | E04B 2/8641 249/134 |
| 4,936,540 A * | 6/1990 | Boeshart | ............... | E04B 2/8647 249/216 |
| 4,938,449 A * | 7/1990 | Boeshart | ............... | E04B 2/8647 249/216 |
| 4,972,646 A | 11/1990 | Miller et al. | | |
| 5,323,578 A * | 6/1994 | Chagnon | ............... | E04B 2/8647 249/215 |
| 5,431,368 A * | 7/1995 | Wilde | .................... | E04G 17/06 249/213 |
| 5,459,971 A | 10/1995 | Sparkman | | |
| 5,497,592 A * | 3/1996 | Boeshart | ............... | E04B 2/8647 249/43 |
| 5,657,600 A * | 8/1997 | Mensen | ................ | E04B 2/8617 52/309.12 |
| 5,735,093 A | 4/1998 | Grutsch | | |
| 5,861,105 A * | 1/1999 | Martineau | ............. | E04B 2/8652 249/190 |
| 5,890,337 A * | 4/1999 | Boeshart | ............... | E04B 2/8652 249/191 |
| 5,992,114 A * | 11/1999 | Zelinsky | ............... | E04B 2/8652 249/216 |
| 6,079,176 A * | 6/2000 | Westra | ..................... | E04G 9/10 249/15 |
| 6,230,462 B1 | 5/2001 | Béliveau | | |
| 6,256,962 B1 * | 7/2001 | Boeshart | ................ | E04G 17/06 249/214 |
| 6,293,067 B1 * | 9/2001 | Meendering | .......... | E04B 2/8652 52/426 |
| 6,314,694 B1 * | 11/2001 | Cooper | ................. | E04B 2/8611 249/190 |
| 6,318,040 B1 * | 11/2001 | Moore, Jr. | ............ | E04B 2/8617 52/379 |
| 6,336,301 B1 * | 1/2002 | Moore, Jr. | ............ | E04B 2/8635 52/426 |
| 6,647,686 B2 * | 11/2003 | Dunn | .................... | E04B 2/8641 52/309.17 |
| 6,948,289 B2 * | 9/2005 | Bravinski | ............. | E04B 2/8647 249/187.1 |
| 6,978,581 B1 * | 12/2005 | Spakousky | ........... | E04B 2/8617 52/405.1 |
| 8,555,584 B2 * | 10/2013 | Ciuperca | ................ | E04B 1/355 52/309.12 |
| 2001/0000844 A1 * | 5/2001 | Kubica | ................... | E04G 11/10 52/427 |
| 2001/0027631 A1 * | 10/2001 | Moore, Jr. | ............ | B28B 19/003 52/741.13 |
| 2002/0092253 A1 * | 7/2002 | Beliveau | ............... | B29C 44/1271 52/426 |
| 2003/0033782 A1 * | 2/2003 | Schmidt | ................ | E04B 2/8617 52/426 |
| 2003/0192272 A1 * | 10/2003 | Bravinski | ............. | E04B 2/8635 52/309.11 |
| 2004/0129857 A1 * | 7/2004 | Musk | ...................... | E04G 17/06 249/43 |
| 2004/0237438 A1 * | 12/2004 | Keith | ................... | E04G 17/0742 52/428 |
| 2005/0028467 A1 * | 2/2005 | Bentley | ................. | E04B 2/8647 52/474 |
| 2006/0117690 A1 * | 6/2006 | Garrett | ................. | E04B 2/8617 52/309.11 |
| 2006/0124825 A1 * | 6/2006 | Amend | ..................... | E04B 5/19 249/40 |
| 2006/0248832 A1 * | 11/2006 | Shidler | ................. | E04G 17/06 52/426 |
| 2006/0277855 A1 * | 12/2006 | Westra | ................... | E04B 1/762 52/309.11 |
| 2007/0094973 A1 * | 5/2007 | Zhu | ......................... | E04B 1/161 52/415 |
| 2007/0094974 A1 * | 5/2007 | Velickovic | ............ | E04B 2/8652 52/426 |
| 2008/0005991 A1 * | 1/2008 | Meilleur | ............... | E04B 2/8635 52/426 |
| 2008/0028709 A1 * | 2/2008 | Pontarolo | ............. | E04B 2/8647 52/426 |
| 2008/0083867 A1 * | 4/2008 | Myers | .................... | E04G 17/06 249/219.1 |
| 2008/0277560 A1 * | 11/2008 | Simonsen | .............. | E04G 11/18 249/46 |
| 2009/0013629 A1 * | 1/2009 | Boeshart | ............... | E04B 2/8617 52/426 |
| 2009/0057530 A1 | 3/2009 | Sheckter et al. | | |
| 2009/0173870 A1 * | 7/2009 | Long, Sr. | ................ | E04G 11/18 249/16 |
| 2009/0218474 A1 * | 9/2009 | Bowman | ................ | E04B 2/8611 249/18 |
| 2011/0057090 A1 * | 3/2011 | Spude | ................... | E04B 2/8652 249/19 |
| 2011/0239566 A1 * | 10/2011 | Ciuperca | ................ | B23P 11/00 52/259 |
| 2013/0074432 A1 * | 3/2013 | Ciuperca | ................ | E04B 1/21 52/309.4 |
| 2013/0180192 A1 * | 7/2013 | Crosby | ................. | E04B 2/8635 52/309.12 |
| 2013/0263544 A1 * | 10/2013 | Pfeiffer | ................. | E04B 2/8617 52/407.1 |
| 2013/0312350 A1 * | 11/2013 | Kreizinger | ............ | E04G 11/00 52/426 |
| 2013/0326980 A1 * | 12/2013 | Hilliard, Sr. | .......... | E04B 2/8652 52/309.1 |
| 2015/0167295 A1 * | 6/2015 | Baader | ................. | E04B 2/8635 249/40 |

OTHER PUBLICATIONS

Written Opinion Corresponding to PCT/CA2014/000904 dated Mar. 11, 2015.

(56) References Cited

OTHER PUBLICATIONS

European Patent Office, Supplementary European Search Report, EP3084095.

* cited by examiner

INSULATED CONCRETE PANEL FORM AND METHOD OF MAKING SAME

CROSS REFERENCES

This application claims priority to U.S. Patent Application No. 61/917,188 filed Dec. 17, 2013 entitled "Improved Insulated Concrete Panel Form and Method of Making Same", incorporated herein in its entirety.

TECHNICAL FIELD

The present disclosure relates to insulated concrete formwork (ICF) used for concrete construction. More specifically, the present disclosure relates to an improved ICF pre-formed panel system and method of making same.

BACKGROUND

Concrete forms have long been used as formwork for the construction of concrete structures, such as the walls or floors of a building. Traditional form systems typically entail setting up two spaced apart form panels and pouring concrete into the space created between the panels. After the concrete hardens, the forms are removed, leaving the cured concrete wall. Traditional systems, however, have several drawbacks including the time required to erect the forms, the time for the concrete to cure, and the time to take down the forms, making the process expensive and labour-intensive.

Many modular insulated concrete form (ICF) systems are been developed to overcome the drawbacks of traditional form systems. Modular ICF systems typically comprise setting up the form system, generally classified as either "block" or "panel" systems, pouring the concrete into the space between the forms and leaving the form in place. As such, the insulating form becomes a permanent part of the structure after the concrete cures. Modular ICF systems are increasingly popular because they serve to insulate the concrete structure in addition to containing the fluid concrete as it solidifies, reducing the time and cost required to create the structure.

"Block" ICF systems typically comprise preassembled blocks having two expanded polystyrene (EPS) foam members connected together with ties or webs, wherein the ties or webs create a cavity between the two foam members for receiving fluid concrete. The ties or webs connecting the panels together can be molded to the foam members during the manufacturing process. As such, block ICF systems are often referred to as "fixed-tie" systems, and the blocks are installed at the construction site by stacking the blocks one on top of another (in a staggered fashion similar to the assembly of a brick wall). Blocks are then affixed together by fastening the webs of one block to the webs of an adjacent block manually, often with cable-ties.

As a result the manufacturing process, however, the size, shape and cavity size of EPS blocks are limited by the molding machine used to create the block. Further, stacking multiple blocks one atop the other creates a plurality of joints between the blocks, reducing the overall strength of the wall, increasing the risk of vertical or horizontal skewing, and making the incorporation of design elements, such as windows, doors, corners etc., difficult.

"Panel" ICF systems are often constructed to be longer (e.g. taller) than block systems for faster installation. A number of variations of modular panel ICF systems and methods for their use have been developed. Typically, such panel ICF systems use two opposed EPS foam panels manufactured from commercially available pre-formed expanded polystyrene slabs connected together with spacers to form a cavity for receiving concrete between the two panels. The polystyrene slabs are cut down to size using a hot-wire cutting process and the spacers connecting the panels together are extruded to the desired size/shape from plastic materials before being affixed to the panels. The spacers are either fastened to the interior surface of the panels, or extend through the panels themselves, to create the cavity therebetween. Spacers or "bridging members" are known to have varying shapes, sizes, and strengths, often being used to reinforce the building structure.

Panel ICF systems allow for the manufacture of larger panels, resulting in easier and faster installation at the construction site. The panels can also be stacked one on top of the other (many stories high) to form the concrete structure. Larger panels also reduce the number of joints between panels and the risk of the wall skewing, increasing the overall strength of the wall. Design elements, such as doors and corners, are also easier to incorporate in panel structures. Although the prior art proposes variations to achieve improvements with concrete form systems, however, many drawbacks still exist.

By way of example, Canadian Patent Application No. 2,597,832 describes a panel ICF system where two panels are connected together by individual internal spacers coupled to individual external studs protruding through the panel and held together by external support straps. Both panels are pre-formed and cut from an EPS slab to the desired panel size and shape, including the apertures through the panels for receiving the internal spacers/external studs. At the construction site, the worker must first line the two panels up then manually position each individual spacer into the apertures of both panels. This laborious process requires that cutting of the panels be extremely precise to achieve proper alignment of the spacers/studs and apertures for receiving same.

A similar system is described in U.S. patent application Ser. No. 12/200,846, however the individual spacers are mounted on a common spacer "frame" (extending vertically up the interior surface of the panel). Use of the spacer frame provides simpler installation than having to align a plurality of individual spacers. Although somewhat easier to install, the panel system nonetheless requires detailed positioning and cutting of the pre-formed panels and the apertures therethrough for receiving the internal spacer "frame" and corresponding studs. The system is also held together by external connector straps.

Despite the benefits provided by known panel ICF systems, the manufacturing process of cutting panels from standard EPS creates waste of excess material and must be accurate (e.g. placement of apertures for receiving spacers, and positioning of spacers with corresponding external stud and strapping) for on-site assembly of the panel structure to be efficient and successful. One further disadvantage common to the prior art is the limited ability to readily vary the spacing between the side panels of the forms, and therefore the thickness of the concrete wall.

There is a need for an improved ICF panel system and a process of making same, the system being capable of being manufactured into one continuous section for easy installation in the structure. It is desired that such a system could provide an internal stabilizing frame for use as a mold to receive expandable polystyrene material, such that the frame becomes integral to the panels molded thereto. Such a system may provide for easy assembly of pre-formed panels at the construction site, without the panels being limited in size or shape.

SUMMARY

There is provided an improved insulated concrete form panel system comprising two opposed form panels positioned in spaced relation to create a cavity therebetween, and an internal skeletal frame positioned within the cavity, wherein the frame is pre-assembled and serves as a mold for receiving expanded polystyrene material to form the opposed panels. According to embodiments herein, the internal frame comprises a plurality of bridge members irreleasably connected to a plurality of stud members, such that the bridges are positioned substantially perpendicular to the studs. The internal frame is integrally connected to the opposed form panels molded thereto, and provides that each panel pair section can be mechanically connected to adjacent panel pair section via both the bridge members connecting to adjacent bridge members, and via the stud members connecting to stud members positioned thereabove or below. It is understood that any reference to horizontal, vertical, above or below are for explanatory purposes only and are not intended to be limiting.

More specifically, an insulated concrete form panel system is provided, the system comprising first and second panels having exterior and interior surfaces and positioned in opposed spaced relation forming a cavity between the interior surfaces, an internal connector frame disposed within the cavity having a plurality of bridge members irreleasably connected to a plurality of stud members, each bridge member having a first end and a second end, each first and second end having connection means for connecting adjacent bridge members positioned end-to-end, and a plurality of side ends, each side end having opposed first coupling means for coupling the bridge members to the stud members, and each stud member having a first end, a second end, each first and second end having connection means for connecting adjacent stud members positioned end-to-end, and at least one second coupling means corresponding to the first coupling means for coupling the bridge members to the stud members, wherein the stud members are integral to first and second panel members. It is understood that the first and second panels are irreleasably connected to one another via internal frame, and that adjacent first and second panel pairs are slidably connected to one another via mechanical ("friction" or "interference fit"), increasing the integrity of the structure. A method of manufacturing the insulated concrete form panel system is also provided.

A method of manufacturing an insulated concrete form panel system is also provided, the panel system having first and second panels in opposed spaced relation forming a cavity therebetween for receiving liquid concrete, the method comprising:
  a. providing assembly means for assembling a mold frame having at least one bridge member irreleasably connected to at least one stud member, the bridge and stud members positioned substantially perpendicularly to each other to form a skeletal matrix,
  b. applying an expandable polymer material for forming the first and second panels to the connector frame,
  c. allowing the polymer material to solidify.

An apparatus of manufacturing the present insulated concrete form system is also provided. The apparatus may or may not be entirely automated.

DESCRIPTION OF EMBODIMENTS

The present insulated concrete form system and method of making same relate to the fabrication of concrete walls, foundations, floors, and other concrete structures. Apparatus and methodologies more particularly described herein are intended as illustrative only since numerous modifications and variations therein will be apparent to those skilled in the art.

Figure 1:
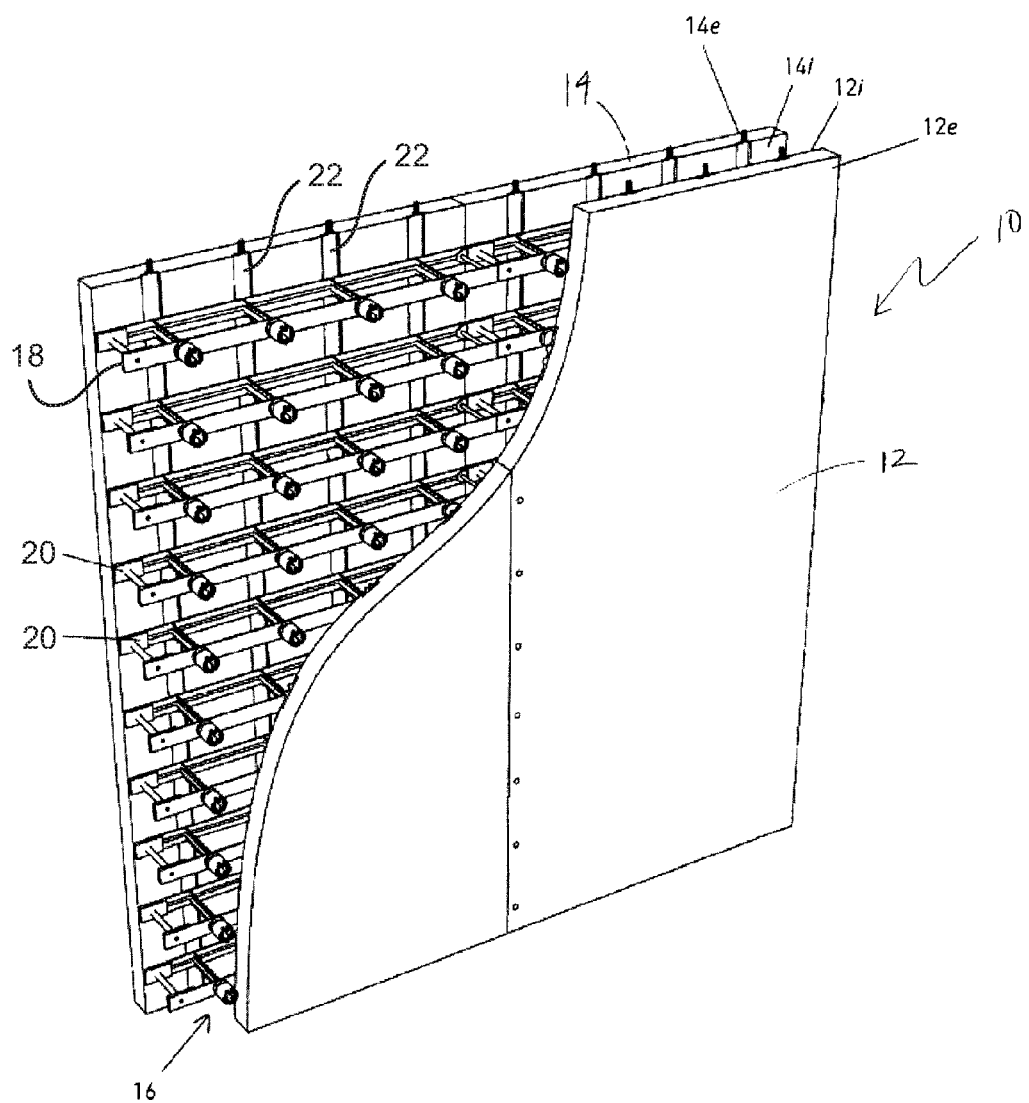
FIG. 1 shows a perspective side view of one panel pair of the present system according to embodiments herein.

According to embodiments herein, the present insulated concrete form (ICF) system 10 comprises first and second panels 12,14, each panel having interior surfaces 12*i*,14*i*, and exterior surfaces 12*e*,14*e*, respectively. Having regard to FIG. 1, in position, first and second panels 12,14 are in opposed spaced relation such that their interior surfaces 12*i*,14*i* form a space or cavity 16 therebetween. During installation, concrete is poured in its fluid state into cavity 16 and allowed to cure (i.e., harden) to form the structure. The type and volume of concrete received within cavity 16 is determined by cavity 16, that is—by the distance between surfaces 12*i*,14*i* and height of panels 12,14.

Panels 12,14 can be manufactured from any appropriate lightweight foam material including an expandable polymer material such as expanded polystyrene ("EPS"). The polymer material may be in particulate or bead form, provide desired thermal insulation and sufficient strength (R factor, high density, etc.) to hold the concrete. The polymer material may further provide impedance to sound transmission.

According to embodiments herein, panels 12,14 can be manufactured to have any desired pre-determined width, length and height according to the particular structure being built. Panels 12,14 may each have a standard width or thickness of approximately 3-3¼ inches, and having a standard length (e.g., side to side, or horizontal to the ground) of approximately 12-48 inches, and any height (e.g., extending longitudinally) that may be desired including a standard height of at least 4 feet. A person skilled in the art would appreciate that the size, shape and dimensions of panels 12,14 can be altered according to the particular structure being built. It is further understood that the panels 12,14 may be installed vertically or horizontally (for e.g. in a foundation setting below-grade), and that any reference to the "width", "height" or "length" of panels 12,14 is for explanatory purposes only and is not intended to limit the scope of the present invention.

Panels 12,14 are connected to one another by internal connector skeleton "matrix" or frame 18. Connector frame 18 comprises horizontal bridge member 20 and vertical stud member 22. Bridge 20 and stud 22 couple to form a skeletal connector frame 18 of the present structure, the frame 18 being pre-assembled to serve as a mold for the application of the expandable polymer material to form panel 12,14. It is understood that the number of bridge members 20 and studs 22 positioned in frame 18 can dictate the overall size (e.g. height and length) of panels 12,14.

Figure 2A:
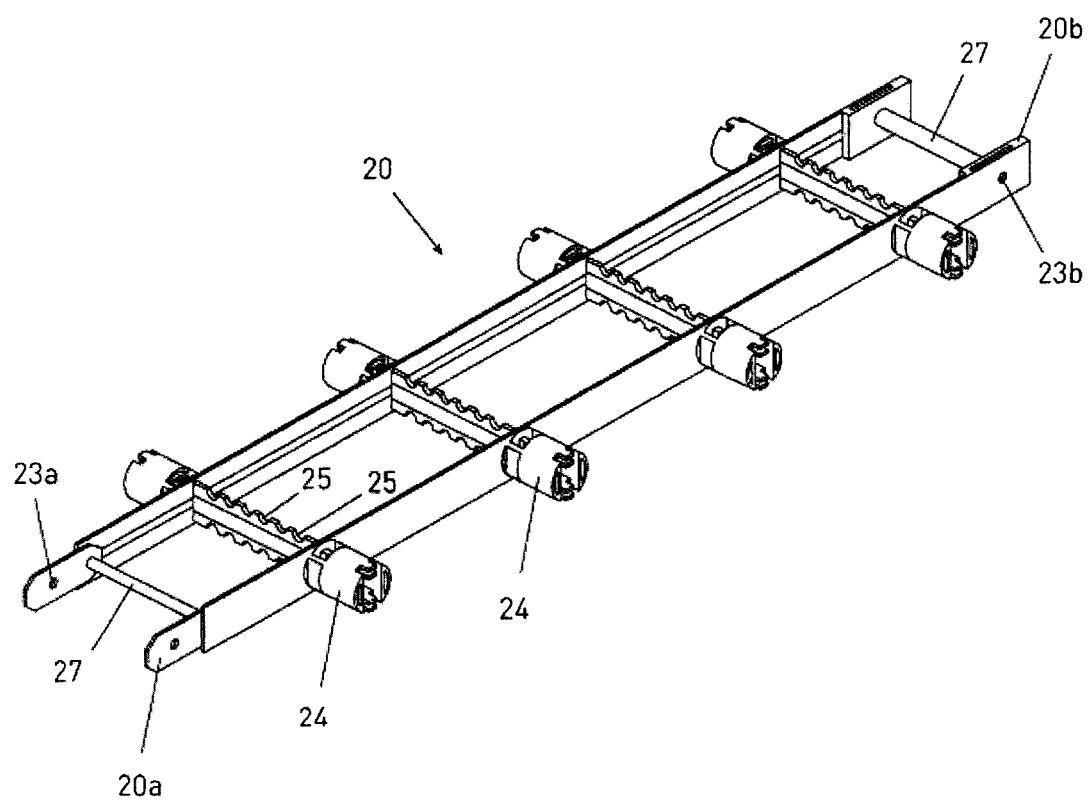
FIG. 2A shows a perspective side view of the bridge element according to embodiments herein.
Figure 2B:
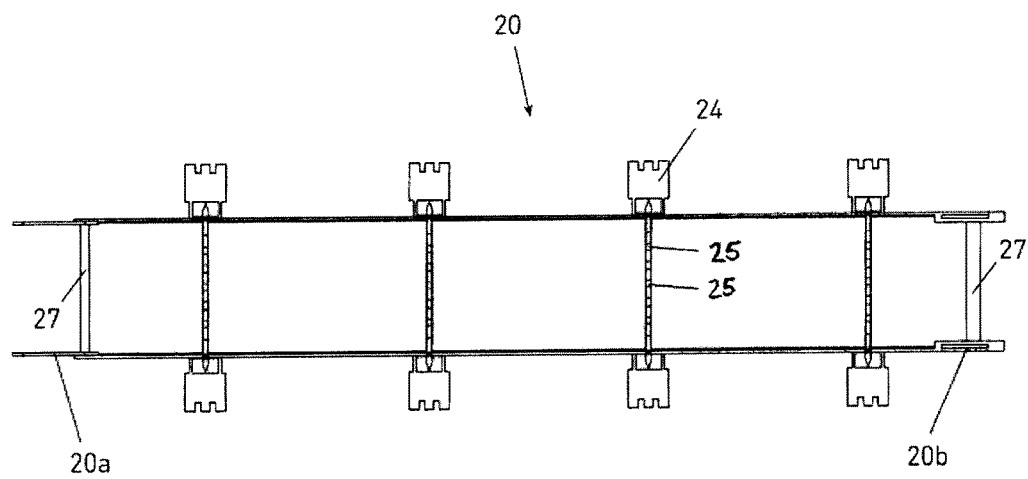
FIG. 2B shows a top down view of the bridge in FIG. 2A.

FIGS. 2A and 2B show one embodiment of bridge member 20 having a first end and a second end. First and second end of bridge member 20 may have connection means 20a,20b for mechanically (e.g., slidably) engaging bridge members 20 positioned adjacent to one another (e.g. end-to-end) in skeletal frame 18. Each connection means 20a, 20b means may form corresponding apertures 23a,23b, respectively, for securing adjacent bridge members 20 together by interference or "friction" fit. For example, during installation, the first end of bridge members 20 of a first wall section is slidably received by the second end of bridge members 20 of a second adjacent wall section being placed into position. More specifically, female connection means 20b of the first bridge members 20 slidably receive male connection means 20a of the second, adjacent bridge members 20. Once in sliding engagement, apertures 23a,23b align and a bolt or other securing member (not shown) may be positioned through both apertures 23a,23b, further securing the structure. A person skilled in the art would appreciate that apertures 23a,23b or any other connecting means may be used to secure bridge members 20 positioned in end-to-end alignment. Bridge members 20 may further comprise stabilizing bar 27 for guiding bridge members 20 together and further stabilizing bridge members 20.

Figure 5:
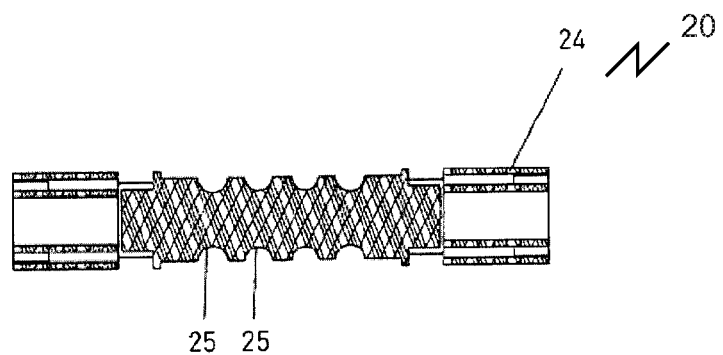
FIG. 5 shows a side view of bridge member having grooves for receiving reinforcing steel according to embodiments herein.

FIGS. 2A and 2B also show bridge member 20 having at least one side end, each side end having opposed couplings for irreleasably connecting bridge 20 to studs 22. For example, side ends may have a coupling means 24 for coupling bridge member 20 to stud 22. Coupling means 24 may comprise female "snap-fit" engagement means for receiving corresponding second coupling means 26 of stud 22. It is understood that at least one bridge member 20 may be positioned perpendicularly to a plurality of studs 22 to form skeletal frame 18. In some embodiments, bridge members 20 may be positioned to extend laterally (horizontally) along interior surfaces 12i,14i of panels 12,14, although reference to the horizontal and vertical are not limiting. Side ends may further comprise grooves or recesses 25 (FIG. 5) for receiving reinforcing steel, such as re-bar, prior to concrete being poured into cavity 16. It is understood that the reinforcing steel may be utilized to provide further structural integrity to the concrete.

Figure 3A:
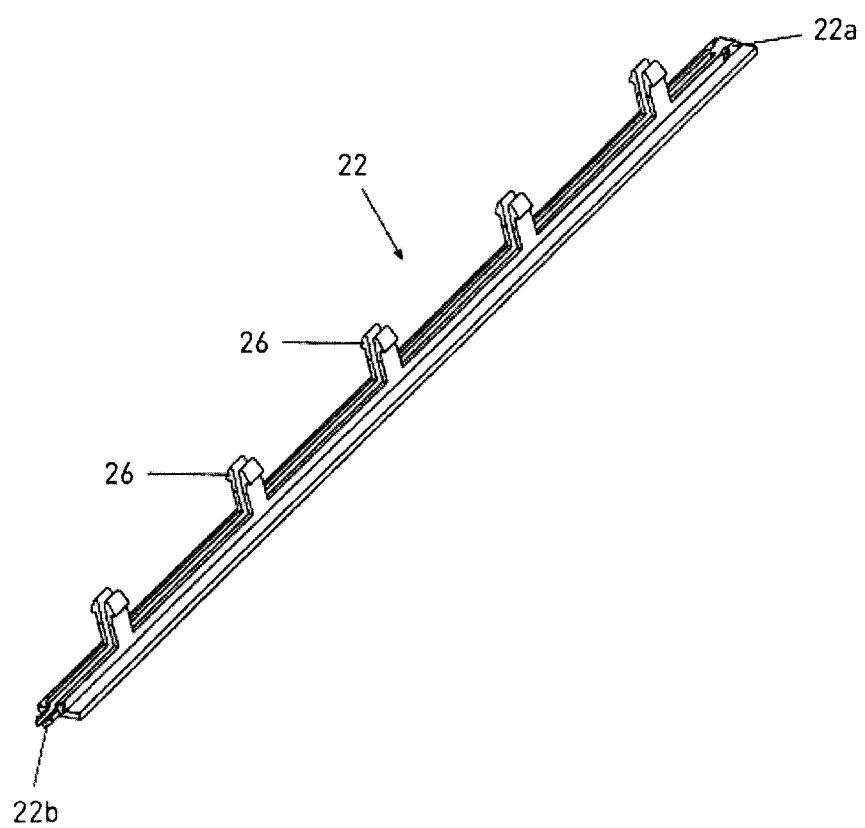
FIG. 3A shows a perspective side view of the stud elements according to embodiments herein.
Figure 3B:
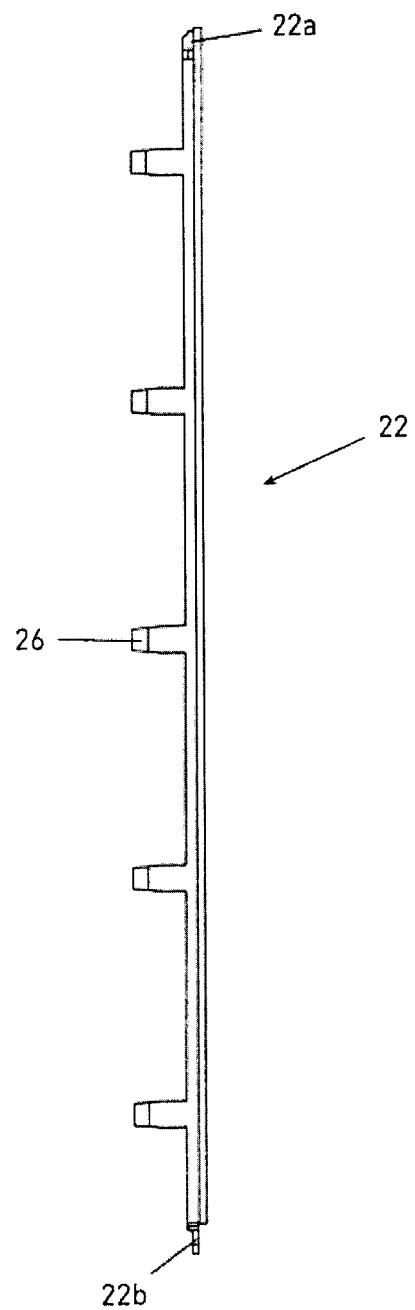
FIG. 3B shows a side view of the stud in FIG. 3A.

FIGS. 3A and 3B show one embodiment of stud member 22 having a first (e.g., upper) end and a second (e.g., lower) end. First and second ends of stud 22 may have connection means 22a,22b for slidably engaging other studs 22 positioned adjacent thereto (e.g. above and below) in frame 18. For example, during installation, first connection means 22a of studs 22 in a first wall section may comprise a female end 22a for slidably receiving the corresponding male end 22b of studs 22 in a second wall structure being positioned above the first wall section. In embodiments herein, studs 22 may be positioned to extend longitudinally (e.g., vertically) along interior surfaces 12i,14i of panels 12,14, although reference to the horizontal and vertical are not limiting. More than one stud 22 may be aligned prior to forming panels 12,14, increasing the length (height) of the panels 12,14 as desired.

Figure 4:
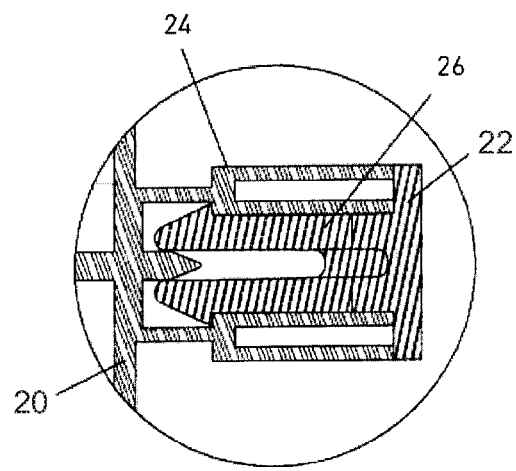
FIG. 4 shows a zoomed in view of the engagement (e.g. "snap-fit") between the bridge and stud elements according to one embodiment herein.

FIGS. 3A and 3B also show stud member 22 having at least one coupling means 26, said coupling means 26 positioned in spaced longitudinal relation along stud 22, for irreleasably connecting studs 22 to bridge members 20. Coupling means 26 may comprise male "snap-fit" engagement means, as shown in FIG. 4, for being received by corresponding coupling means 24 of bridge members 20. It is understood that a plurality of studs 22 may be coupled to at least one bridge member 20 to form skeletal frame 18. Reference to horizontal and vertical are for explanation purposes only.

Figure 6:
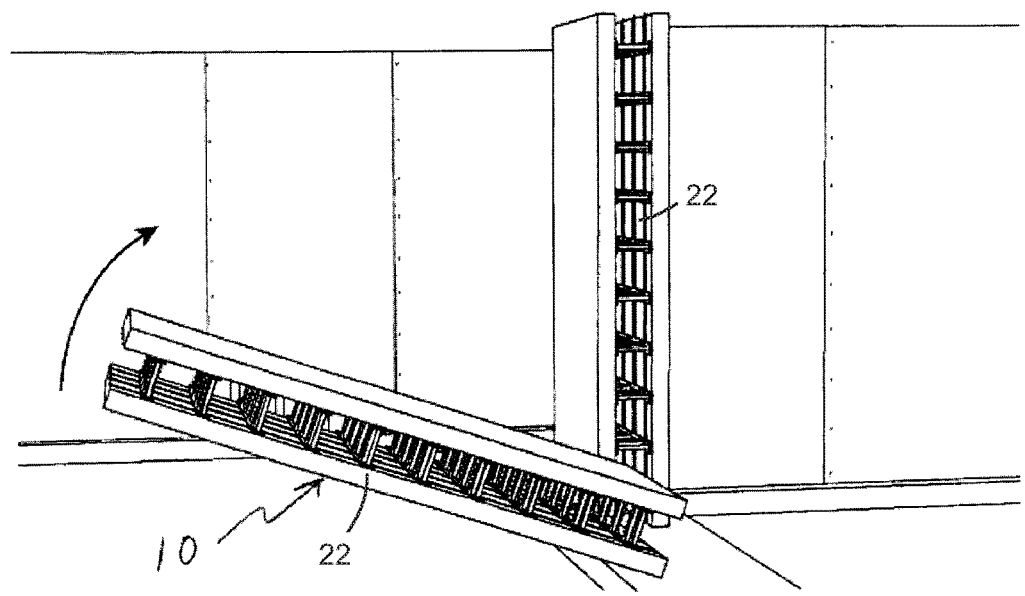
FIG. 6 shows a perspective view of a panel form according to embodiments herein being installed in a wall structure.
Figure 7:
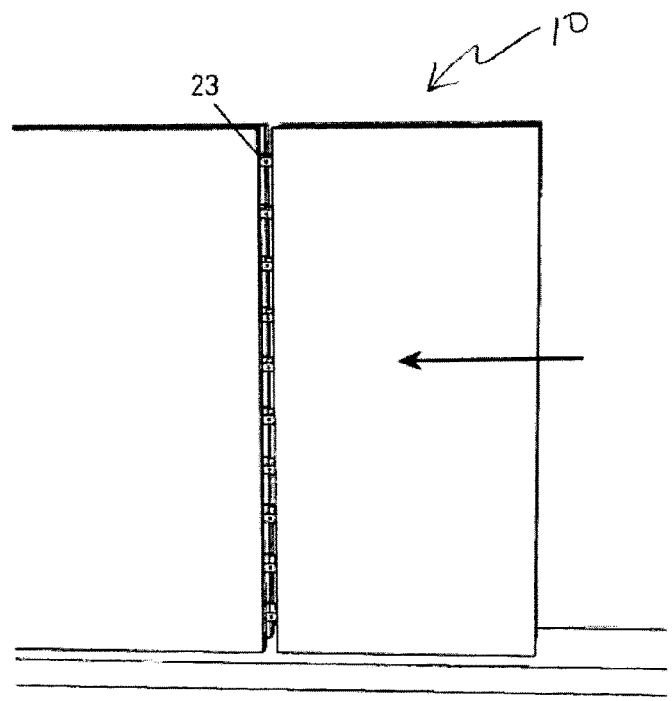
FIG. 7 shows a side view of the panel form in FIG. 6 being slidably received by an adjacent panel form in the wall structure.

As depicted in FIGS. 6 and 7, it is understood that first and second panels 12,14 are irreleasably connected to one another via internal frame 18, and that, during installation, adjacent first and second panel 12,14 pairs can be mechanically fastened to one another (eliminating the need to "tie" the panels together), increasing structure stability, but easily disengaged if errors, concept changes or damage to panels 12,14 occur. Mechanical engagement between first and second panel 12,14 pairs increases the integrity and strength of the structure, reduces time and expertise required to assemble the structure, and aligns of the panels 12,14 of the overall structure (i.e. pulling adjacent panel pairs together and minimizing skewing between pairs). The mechanical connection can also be sufficiently sufficient to prevent any skewing between the wall and the concrete footing (upon which the present system 10 is installed) by pulling the panels into alignment.

Figure 8:
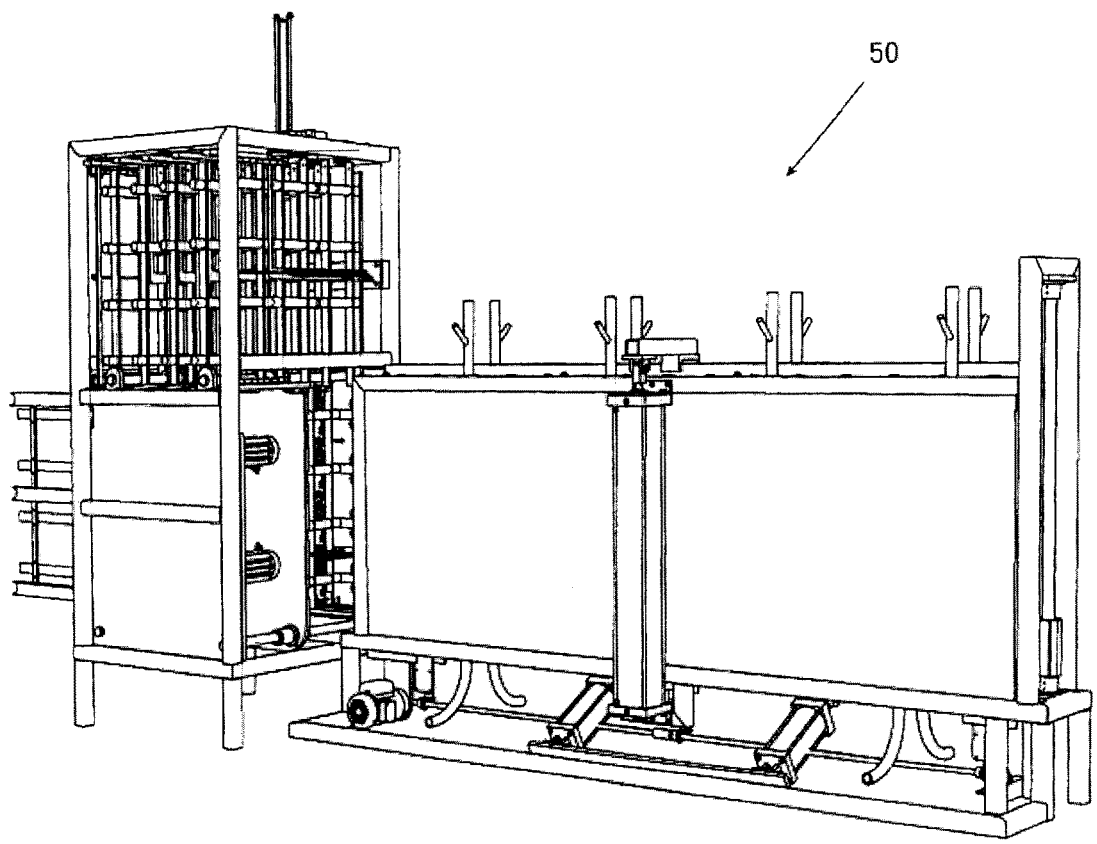
FIG. 8 shows a side perspective view of an apparatus for forming the present panel system according to embodiments herein.
Figure 9:
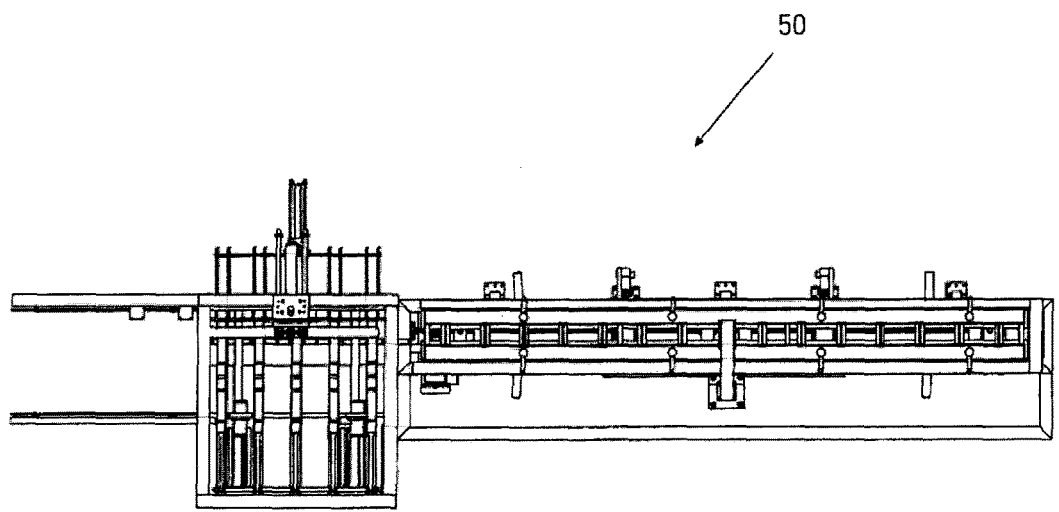
FIG. 9 shows a top down view of the apparatus in FIG. 8.

It is contemplated that the present insulated concrete form system 10 may be configured to create form panels 12,14 via manual or automated means, or a combination thereof. For example, FIGS. 8 and 9 depict apparatus 50 for manufacturing panels 12,14 according to embodiments herein. It is understood that apparatus 50 may be used to pre-assemble skeletal frame 18 according to the size of panels 12,14 being manufactured, to apply expandable material to the frame 18 (e.g., allowing the material to mold around, or to, studs 22 of the frame 18), to allow the material to cure to form panels 12,14 integral to frame 18 and, once cured, to cut the panels 12,14 to size. Apparatus 50 may be entirely automated.

It is contemplated that panels 12,14 can be molded to pre-assembled frame 18 to form one solid, continuous section of the structure, creating more accurate panel 12,14 tolerances, minimizing on-site adjustment, and reducing worker error (e.g. "gaps" created by hot-wire cutting mechanisms). Molding panels 12,14 directly to the pre-assembled frame 18 enables the present system 10 to be entirely pre-formed and delivered to the job site for easy installation, saving time, costs and the necessity of having skilled workers.

It is understood that the present apparatus and method of making same may result in a substantial reduction in manufacturing and assembly time and costs because the present apparatus may be pre-assembled and pre-molded prior to delivery to the job site, wherein the panels 12,14 pairs need only be mechanically connected together in position (beside each other or one atop the other) at the job site. It is further contemplated that the present insulated concrete form system 10 may be used to manufacture custom panel systems, such as corners, angles or windows. The present insulated concrete form system 10 may also be custom designed to be incorporated into or used with pre-existing block or panel ICF systems.

Example 1

It is understood that the width, height and length of the present insulated concrete form system can be dictated by the size of the structure being built.

By way of example, the present form system may be configured such that individual bridge members may have a width (between side ends) corresponding to standard building sizes (i.e. to create a cavity of between approximately two feet and four feet). Individual bridge members 20 may further be configured to extend to standard building lengths, or to form panels approximately 4", 6" or 8" long. It is understood, however, that a plurality of bridge members 20 can be aligned end-to-end to create substantially longer panels 12,14.

The present form system may further be configured such that studs 22 may have a height corresponding to standard building construction (i.e. at least four, eight or twelve feet tall). It is understood that a plurality of stud members 22 may be aligned end to end to create substantially taller panels 12,14.

The present form system may further be configured to create shaped or non-linear (e.g. curved) panels 12,14. Panels 12,14 may also be adapted for use with known or customized "corner" members, as would be appreciated by a person skilled in the art.

It is contemplated that the present form system may be manufactured manually (e.g. assembling frame 18, foaming and cutting the panels 12,14 by hand), automatically by a apparatus 50, or a combination thereof. Where automated, the present system may be entirely continuous, creating a single panel unit that can be easily installed at the construction site.

It is an advantage of the present form system that, when positioned in place, panels 12,14 connect to panels 12,14 positioned beside, above or below to increase the integrity and strength of the structure, to reduce the time and expertise required to install panels 12,14, particularly in higher structures, and to serve to align the panel forms creating the overall structure (i.e. minimizing skewing caused by the wall or floor of the structure).

It should be known and understood that the present disclosure provides a detailed description of various elements required to build a panel system used in constructing a concrete structure, but that many other known elements required to finish the structure have not described herein.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. An insulated concrete form, comprising:
first and second panels having exterior and interior faces and positioned in opposed spaced relation forming a cavity between the interior faces;
an internal connector frame disposed within the cavity having a plurality of bridge members and a plurality of stud members, in which the plurality of bridge members a) extend between first and second side edges of each of the first and second panels, b) extend between the interior faces of the first and second panels, and c) are vertically spaced between top and bottom edges of the first and second panels;
in which the plurality of stud members, extend between the top and bottom edges of the first and second panels, with a first set of the plurality of stud members being integral with the first panel and a second set of the plurality of stud members being integral with the second panel;
each of the plurality of bridge members having a first end and a second end, each first end located adjacent the first side edges, and each second end located adjacent the second side edges, with each of the first and second ends having a connector, with the connectors of the first and second ends being adapted to mechanically connect to connectors of second and first ends, respectively, of a plurality of bridge members of a second internal connector frame, which is identical to the internal connector frame, if the second internal connector frame is positioned in use adjacent the insulated concrete form such that the first or second side edges of the second internal connector frame abut the second or first side edges, respectively, of the insulated concrete form;
each of the plurality of bridge members having first and second sides, with the first sides located adjacent the first panel and the second sides located adjacent the second panel, with the first and second sides having couplers that are adapted to mechanically connect to couplers of the first and second sets of the plurality of stud members to irreleasably connect the plurality of bridge members to and between the first and second sets of the plurality of stud members; and
each of the plurality of stud members having a top end and a bottom end, each top end, of each stud member located adjacent the top edges, and each bottom end located adjacent the bottom edges, with each of the top and bottom ends having a connector, with the connectors of the top and bottom ends being adapted to mechanically connect to connectors of bottom and top ends, respectively, of a plurality of stud members of the second internal connector frame, if the second internal connector frame is positioned in use adjacent the insulated concrete form such that top or bottom edges of the second internal connector frame abut the bottom or top edges, respectively, of the insulated concrete form.

2. The insulated concrete form of claim 1, wherein:
each of the plurality of bridge members extend a) horizontally between the first and second side edges of the first and second panels, and b) horizontally between the interior faces of the first and second panels; and
each of the plurality of stud members extends vertically between the top and bottom edges of the first and second panels.

3. The insulated concrete form of claim 1, wherein the first and second panels are formed from an expandable polymer material.

4. The insulated concrete form of claim 3, wherein the expandable polymer material is expanded polystyrene.

5. The insulated concrete form of claim 1, wherein the first and second panels have a pre-determined width, height and length.

6. The insulated concrete form of claim 5, wherein the first and second panels are molded to have a width of approximately 3-3¼ inches.

7. The insulated concrete form of claim 5, wherein the first and second panels have a length of approximately 12 to 48 inches.

8. The insulated concrete form of claim 5, wherein the first and second panels have a height of at least 4 feet.

9. The insulated concrete form of claim 1, wherein the connectors of the first and second ends of the plurality of bridge members comprise apertures that are adapted to align in use with apertures in the connectors of the second and first ends, respectively, of the plurality of bridge members of the second internal connector frame, to permit a bolt to pass through the aligned apertures to secure the insulated concrete form and the second internal connector frame together.

10. The insulated concrete form of claim 1 in which the connectors of the plurality of bridge members are adapted to mechanically connect, via a sliding connection, in use to the connectors of the plurality of bridge members of the second internal connector frame.

11. The insulated concrete form of claim 1 in which the connectors of each stud member of the plurality of stud members are adapted to mechanically connect, via a sliding connection, in use to the connectors of the plurality of stud members of the second internal connector frame.

12. The insulated concrete form of claim 1 in which each bridge member of the plurality of bridge members comprises:
   beams that are in opposed space relationship and extend between the first and second side edges of the first and second panels; and
   cross members connecting the beams.

13. The insulated concrete form of claim 12 in which the cross members have a plurality of rebar grooves.

14. The insulated concrete form of claim 1 in which the connectors of the plurality of bridge members are adapted to mechanically connect in use to the connectors, of the plurality of bridge members of the second internal connector frame by a male-female connection.

15. The insulated concrete form of claim 1 in which the connectors of the plurality of stud members are adapted to mechanically connect in use to the connectors, of the plurality of stud members of the second internal connector frame by a male-female connection.

16. The insulated concrete form of claim 1 in which the first and second panels are adapted to mechanically connect by a friction or interference fit to the first and second panels of the second internal connector frame.

17. The insulated concrete form of claim 1 formed as a panel.

18. Formwork comprising the insulated concrete form of claim 1 and the second internal connector frame of claim 1, with the connectors of the plurality of bridge members of the insulated concrete panel connected to the connectors of the plurality of bridge members of the second internal connector frame, which is positioned adjacent the insulated concrete form with first or second side edges of the insulated concrete form abutting second or first side edges, respectively, of the second internal connector frame.

19. Formwork comprising the insulated concrete form of claim 1 and the second internal connector frame of claim 1, with the connectors of the plurality of stud members of the insulated concrete panel connected to the connectors of the plurality of stud members of the second internal connector frame, which is positioned adjacent the insulated concrete form with top or bottom edges of the insulated concrete form abutting bottom or top edges, respectively, of the second internal connector frame.

\* \* \* \* \*